United States Patent [19]

Morse et al.

[11] 4,328,149

[45] May 4, 1982

[54] POLYMERIZATION METHOD UTILIZING A THREE-PHASE EMULSION SYSTEM

[75] Inventors: Lewis D. Morse, Pittsburgh; Kenneth W. Dixon, Thornton, both of Pa.

[73] Assignee: Calgon Corporation, Pittsburgh, Pa.

[21] Appl. No.: 218,864

[22] Filed: Dec. 29, 1980

Related U.S. Application Data

[63] Continuation-in-part of Ser. No. 116,862, Jan. 30, 1980, abandoned.

[51] Int. Cl.$^3$ .......................... C08F 2/16; C08F 2/00; C08G 18/00; C08G 2/00
[52] U.S. Cl. ........................ 524/458; 524/459; 524/460; 524/801; 526/199; 526/200; 526/201; 526/202; 526/203; 526/207; 525/366; 528/44; 528/137; 528/232; 528/254; 528/274; 528/336; 528/373; 528/408; 524/733; 524/804
[58] Field of Search ............... 260/29.2 R, 29.6 H, 260/29.6 T, 29.6 XA, 29.6 R, 29.7 R; 526/201, 206, 207

[56] References Cited

U.S. PATENT DOCUMENTS

| | | | |
|---|---|---|---|
| 3,278,506 | 10/1966 | Chamot | 526/207 |
| 3,284,393 | 11/1966 | Vanderhoff | 526/207 |
| 3,779,907 | 12/1973 | Li | 210/22 |
| 3,806,485 | 4/1974 | Frisque | 260/29.6 NR |
| 3,975,341 | 8/1976 | Trapasso | 526/303 |
| 3,979,349 | 9/1976 | Fink | 260/29.6 RW |
| 3,997,492 | 12/1976 | Kane | 260/29.6 WQ |
| 4,022,736 | 5/1977 | Schmitt | 260/29.6 E |
| 4,070,321 | 1/1978 | Goretta | 260/29.6 H |
| 4,077,930 | 3/1978 | Lim | 526/207 |
| 4,117,215 | 9/1978 | Witenhafer | 526/62 |
| 4,189,559 | 2/1980 | Bueltjer | 526/203 |

OTHER PUBLICATIONS

Matsumoto, S. et al., J. Colloid Interf. Sci., 57(2), pp. 353-361 (1976).

*Primary Examiner*—C. A. Henderson
*Attorney, Agent, or Firm*—Rudolph J. Anderson; Martin L. Katz; R. Brent Olson

[57] ABSTRACT

Polymerization method utilizing a three-phase system: water-in-oil-in-water or oil-in-water-in-oil comprising the steps (a) adding the monomer material to be polymerized into the innermost water or oil phase; (b) adding, with mechanical agitation, the product of Step a to the middle oil or water phase, said phase containing appropriate surfactant, whereby an emulsion is formed; (c) adding, with mechanical agitation, the emulsion product of Step b to the outermost water or oil phase, said phase containing appropriate surfactant, wherein polymerization proceeds in the innermost water or oil phase until complete.

15 Claims, No Drawings

POLYMERIZATION METHOD UTILIZING A THREE-PHASE EMULSION SYSTEM

This application is a continuation-in-part of U.S. Ser. No. 116,862, filed Jan. 30, 1980, now abandoned.

BACKGROUND OF THE INVENTION

1. Field of the Invention

The present invention relates to a polymerization method carried out in a three-phase emulsion system, i.e. a water/oil/water (w/o/w) system, or an oil/water/oil (o/w/o) system, where the polymerization is carried out in the innermost phase of the system.

2. Brief Description of the Prior Art

Emulsion polymerization techniques, both regular oil/water polymerization and inverse water/oil polymerization, are well known. See, for example, *Encyclopedia of Polymer Science and Technology,* Vol. 5, pp. 801–859 (1966).

Three-phase emulsion systems are also known. See, for example, Matsumoto et al, *J. Colloid Interf. Sci.,* 57(2), 353–361 (1976) and Li et al, U.S. Pat. No. 3,779,907. Both describe three-phase emulsions.

However, nothing in the prior art teaches or suggests the novel polymerizaton method of the present invention which utilizes a three-phase emulsion system.

SUMMARY OF THE INVENTION

In accordance with the present invention, there is provided a polymerization method carried out in the innermost phase of a three-phase emulsion system. The three-phase system may be either a water/oil/water (w/o/w) system or an oil/water/oil (o/w/o) system, but is preferably a w/o/w system. When the w/o/w system is employed, a number of important advantages are achieved over the inverse emulsion and other polymerization methods heretofore practiced in the art. Using the w/o/w system, the outermost, or continuous, phase is water, rather than oil, as in the systems of the prior art. Since considerably less oil is employed, a number of advantages ensue. There is a considerable savings in cost since less of the expensive oil phase is required, and availability problems are lessened. There are fewer disposal and recovery problems encountered, and problems concerning toxicity are reduced. Other advantages stem from the excellent control over particle size of the dispersed phase provided with the method of the present invention. Thus, with very small volumes of innermost, or dispersed, phase, better mixing of comonomers and a better chance of random copolymerization can be achieved. Also, a variety of product forms; e.g. beadlets, suspensions and emulsions, can be prepared. Additional advantages flow from the excellent control of heat exchange which is possible where water is the outermost, or continuous, phase. There are substantially less temperature control problems than with systems having oil as the outermost phase; and there is also a greater possibility of isothermal reactions, resulting in better control over the course of polymerization and the properties of the polymer produced. Another advantage is that higher dispersed phase/continuous phase ratios can be used than in current emulsion or suspension polymerization methods, thus permitting higher initial monomer concentration with resulting savings in cost. Yet another advantage is that reactor surface fouling and polymer aggregation, which are common problems in high solids loading, high exotherm suspension and emulsion polymerization methods, are eliminated. Also, inversion problems, common in water-in-oil, or inverse, emulsion polymerization methods, are largely overcome.

When an o/w/o system is imployed, one advantage which is achieved is the creation of an "anhydrous" system where the water is present between the innermost and outermost oil phases.

The types of polymers prepared and the monomers utilized in their preparation may be of any desired type, provided that they are compatible with the innermost phase in which the polymerization is carried out. Water-soluble and oil-soluble free radical and condensation polymers may be prepared. For example, oil-soluble free radical polymers of the following types may be prepared: polystyrene, polymethylmethacrylate, polyvinyl chloride, polyethylene, polyvinyl acetate, polyisoprene, polybutadiene and polypropylene. Water-soluble free radical polymers of the following types may be prepared, including among others, polyacrylic acid, polymethacrylic acid, polyacrylamide, polyvinyl pyrrolidone and polymaleic anhydride. Particularly preferred polymers which may be prepared in accordance with the method of the present invention are polyelectrolytes, especially cationic quaternary ammonium polymers including, among others, poly(meth)acryloxyalkyl ammonium, poly(vinyloxyalkyl ammonium), poly(vinylbenzylammonium), poly(diallylammonium), poly(vinylpyridinium) and poly(meth)acryloxyethyl sulfonium.

Condensation polymers of both the oil-soluble and water-soluble type which may be prepared in accordance with the method of the present invention include, among others, polyoxyethylene, polyesters, polyamides, polyurethanes, phenol formaldehyde and melamine formaldehyde resins, polyacetals and polysulfides.

The oils used in preparing the three-phase systems utilized in the method of the present invention may be selected from a large group of organic liquids which include liquid hydrocarbons and substituted liquid hydrocarbons. A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. Other water immiscible organic liquids which are useful include ethers and oxygenated compounds such as alcohols, ketones, acids and esters.

The oil phase, whether it is the middle phase of a w/o/w system, or the outermost phase of an o/w/o system, will contain one or more surfactants. These will, of course, be of the oil-soluble type and will have low solubility in the water phase or phases of the system. This may also be expressed as the hydrophile-lipophile balance (HLB) of the surfactant, which designates the relative simultaneous attraction of the surfactant for water and for oil, and is determined by the chemical composition and extent of ionization of the surfactant. The HLB of a surfactant is a major factor in determining the type of emulsion that tends to be formed. A scheme devised by ICI-US assigns an HLB number to surfactants; a surfactant which is lipophilic in character is assigned a low HLB number (below 9.0), and one which is hydrophilic is assigned a high HLB number (above 11.0). The surfactants employed in the oil phase of the three-phase system utilized in the method of the present invention should have an HLB number of from 2 to 5.

The surfactants which may be used include anionic, cationic or nonionic surfactants.

Anionic surfactants which are useful include, among others, alkali salts of $C_{12}$–$C_{18}$ carboxylic acids; sulfuric acid esters, particularly alkyl sulfates; alkyl- or alkylarylsulfonates; and phosphoric acid esters.

Cationic surfactants which may be used include, among others, salts of amines or diamines, quaternary ammonium salts and salts of long-chain substituted cyclic amines, e.g. pyridine, morpholine and piperidine.

Nonionic surfactants of various types may also be employed. For example, there my be used ethylene and propylene oxide derivatives such as block copolymers of ethylene oxide and propylene oxide; octyl and nonyl phenol derivatives of ethylene oxide having from 1 to 50 ethylene oxide units per phenol molecule; polyethylenoxy derivatives of alcohols and mercaptans; polyethylenoxy esters; dimerized linoleic acid-polyethylene glycol reaction products; the reaction products of fatty acids and polyols, e.g. pentaerythritol and glycerol; and the glucosides of $C_{12-25}$ fatty acids.

The surfactant in the oil phase of the three-phase system utilized in the method of the present invention is present in an amount of from 0.01 to 40 percent by weight, preferably from 0.1 to 30 percent by weight of the oil phase in which it is incorporated.

The water phase, whether it is the middle phase of an o/w/o system, or the outermost phase of a w/o/w system, will also contain one or more surfactants. These will, of course, be of water-soluble type and should have an HLB number of 8 or higher, preferably of 14 or higher. As with the oil phase, any of a number of different types of surfactants may be employed, selected from various anionic, cationic or nonionic surfactants well-known in the art, as described above.

The surfactant in the water phase of the three-phase system utilized in the method of the present invention is present in an amount of from 0.01 to 10 percent by weight, preferably from 0.1 to 5 percent by weight of the water phase in which it is incorporated.

The outer water phase of the w/o/w system may contain, in addition to a surfactant, or in place of a surfactant, a protective colloid to stabilize the dispersed w/o phase. Suitable protective colloids include polyvinyl alcohol, sodium caseinate, gelatin, gum arabic, alginates, methyl cellulose, hydroxymethyl cellulose, sodium carboxymethyl cellulose, polyvinylpyrrolidone, carrageenan, guar gum, gum agar, hydroxyethyl cellulose, hydroxypropyl cellulose and poly(ethylene/maleic anhydride). Preferred protective colloids are polyvinyl alcohol, sodium caseinate, gelatin and gum arabic.

The middle phase of the three-phase system utilized in the method of the present invention, for example, the oil phase of a w/o/w system, may also contain a stabilizing additive which helps assure the integrity of the three-phase system, especially with respect to maintaining the innermost and middle phases together as discrete beads or droplets within the outermost phase and avoiding their rupture. Suitable stabilizing additives are, for example, polybutadiene, polyisobutylene, poly(styrene/butadiene), and styrene-based polyesters. Preferred stabilizing additives are polyisobutylenes. Suitable stabilizing additives for the water phase of an o/w/o system are, for example, polyethylene glycol, polyvinyl alcohol, polyvinylpyrrolidone, methyl cellulose, hydroxypropyl cellulose, hydroxyethyl cellulose and poly(ethylene/maleic anhydride).

The innermost phase of the three-phase system utilized in the present invention will contain, typically, the monomer or comonomers to be polymerized, as well as a polymerization initiator, catalyst, or chain transfer or blocking agent, where any of these are necessary or desired. The concentration of monomer in the innermost phase may be from 1 to 70 percent by weight of the innermost phase, but is preferably from 20 to 50 percent by weight.

The innermost phase should comprise from 10 to 95 percent by weight of the total three-phase system, and preferably will comprise from 75 to 95 percent of the total three-phase system.

The polymerization method of the present invention is carried out by first incorporating into the innermost phase the monomer or monomers to be to be polymerized, and any one or more of the commonly employed agents such as polymerization initiators, polymerization catalysts, etc.

The innermost phase in which the additives described above have been dissolved is then added to the middle phase of the three-phase system which contains the appropriate surfactant, and an emulsion is formed through mechanical agitation by means of, for example, highspeed stirrers, colloid mills, valve homogenizers, ultrasonic generators and mixing jets. When a stabilizing agent is employed, as described above, it is preferable to add it to the middle phase before the emulsion is formed. However, it is also possible to add the stabilizing agent to the outermost phase.

When the ratio by weight of water phase to oil phase in the w/o emulsion is 0.5 or less, the above methods are suitable in forming the emulsion. At higher ratios, however, it is necessary to feed the water phase to the oil phase slowly during agitation. Thus, at a w/o ratio of 0.9, for example, the water phase should be fed at 17 ml per minute or less. Otherwise, the emulsion tends to invert to o/w.

Finally, the emulsion prepared from the innermost and middle phases, as described above, is added with mechanical agitation to the outermost phase, which contains the appropriate surfactant. A stable three-phase system is thereby established and polymerization proceeds to completion within the innermost phase. Mechanical agitation should be relatively mild so as not to destroy the integrity of the previously formed emulsion prepared from the innermost and middle phases.

The following examples illustrate the polymerization method of the present invention, but without limiting the same.

EXAMPLE 1

An aqueous phase, I, is prepared by dissolving 37.5 g acrylamide, electrophoresis grade, in 77.5 g deionized water. Ten ml 3.994 percent (w/v) aqueous ammonium persulfate is added to yield a system 30 percent in acrylamide and $2 \times 10^{-2}$ M in ammonium persulfate. The pH of the system is adjusted from 4.1 to 6.5 with 0.1 N sodium hydroxide.

An oil phase, II, is used comprising 95 percent by weight of mineral "white" oil with a viscosity of 17 centistokes at 38° C., 4 percent by weight polyamine stabilizing agent and 1 percent by weight sorbitan monooleate surfactant.

The aqueous phase, I, is dispersed in 125 g. of the oil phase, II, by stirring in a Waring Blender for 1½ minutes. Microscopic examination shows the aqueous phase to be dispersed in the oil as spheres of 1 micron or less in diameter.

Two hundred fifty g of outer phase, III, deionized water is added to a 1-liter reaction kettle, fitted with a thermometer, nitrogen feed line with outlet below the surface of the water, condenser and a stirrer with 3", half-moon shaped teflon blade at the bottom of the kettle. The kettle sits in a water bath controlled at 30° C.

Stirring the water, III, at 350 rpm, the w/o emulsion, I in II, is added over 5 minutes. An excellent w/o/w (I in II in III) dispersion develops with the w/o phase dispersed at about 1 mm diameter.

Nitrogen is passed into the system continuously to purge it of air, and the bath temperature is maintained at 30° C. The kettle temperature rises from 29.5° C. to 35.1° C. in 14 minutes, peaks at 36° C. in 17 minutes, and is down to 30° C. in 54 minutes. The outlet of the nitrogen line is raised at 60 minutes, above the surface of the liquid, to keep the reaction purged of air. The temperature is kept at 30° C. for 2 hours after exotherm peak. The w/o/w system maintains its integrity throughout the reaction.

The dispersion is sampled at 70 minutes, withdrawing 5 ml. On standing, the sample separates into two layers. The lower layer, III, shows no precipitate when 5 volumes acetone is added. Thus, there is no polymer in this phase. The upper layer, the w/o emulsion is stirred in 2 volumes n-butanol which dissolves the oil and causes a copious precipitate.

At the end of the reaction, microscopic examination of the w/o phase, I in II, shows the dispersed spheres to have a diameter of 3 microns or less. The reaction product is poured into a separatory funnel. It separates into two distinct layers, a clear lower layer, phase III, the outer water phase, and a top layer consisting of phase I, the inner aqueous phase dispersed in II, the oil phase.

A sample of the w/o emulsion shows the presence of 0.1 percent acrylamide monomer, or 0.7 percent residual monomer. Butanol, added to a sample of the emulsion, dissolves the oil and causes a copious precipitate to form. This precipitate is determined by IR to be polyacrylamide.

The outer water, phase III, is found to contain 1.8 percent acrylamide monomer, showing some leakage from the inner aqueous phase, and 0.03 percent polyacrylamide, probably from traces of w/o emulsion present.

EXAMPLE 2

An aqueous phase, I, is prepared by dissolving 37.5 g acrylamide, electrophoresis grade, in 77.5 g deionized water. Ten ml 3.994 percent (w/v) aqueous ammonium persulfate is added to yield a system 30 percent in acrylamide and $2\times10^{-2}$ M in ammonium persulfate. The pH of the system is adjusted from 4.1 to 6.5 with 0.1 N sodium hydroxide.

An oil phase, II, is used comprising 94 percent by weight of Sunpar ® 115, a paraffin, 1 percent by weight Lubrizol ® 3140, a polyisobutylene, and 5% by weight sorbitan monooleate surfactant.

The aqueous phase, I, is dispersed in 125 g of the oil phase, II, by stirring in a Waring Blender for 1½ minutes. Microscopic examination shows the aqueous phase to be dispersed in the oil as spheres of 1 micron or less in diameter.

Two hundred fifty g of outer phase, III, comprising 98.95 percent deionized water, 1.00 percent dissolved gum arabic and 0.05 percent dissolved Elvanol ®, 50-42 polyvinyl alcohol, is added to a 1-liter reaction kettle, fitted with a thermometer, nitrogen feed line with outlet below the surface of the water, condenser, and a stirrer with 3", halfmoon shaped teflon blade at the bottom of the kettle. The kettle sits in a water bath controlled at 30° C.

Stirring the water, III, at 350 rpm, the w/o emulsion, I in II, is added over 5 minutes. An excellent w/o/w (I in II in III) dispersion develops with the w/o phase dispersed at about 1 mm diameter.

Nitrogen is passed into the system continuously to purge it of air, and the bath temperature is maintained at 30° C. The kettle temperature rises from 30° C. to 35° C. in 14 minutes, peaks at 36° C. in 17 minutes, and is down to 30° C. in 54 minutes. The outlet of the nitrogen line is raised at 60 minutes, above the surface of the liquid, to keep the reaction purged of air. The temperature is kept at 30° C. for two hours after exotherm peak. The w/o/w system maintains its integrity throughout the reaction.

The dispersion is sampled at 70 minutes, withdrawing 5 ml. On standing, the sample separates into two layers. The lower layer, III, shows no precipitate when 5 volumes acetone is added. Thus, there is no polymer in this phase. The upper layer, the w/o emulsion, is stirred in 2 volumes n-butanol which dissolves the oil, and causes a copious precipitate.

At the end of the reaction, microscopic examination of the w/o phase, I in II, shows the dispersed spheres to have a diameter of 3 microns or less. The reaction product is poured into a separatory funnel. It separates into two distinct layers, a clear lower layer, phase III, the outer water phase, and a top layer consisting of phase I, the inner aqueous phase dispersed in II, the oil phase.

A sample of the w/o emulsion shows the presence of 0.1 percent acrylamide monomer, or 0.7 percent residual monomer. Butanol, added to a sample of the emulsion, dissolves the oil and causes a copious precipitate to form. This precipitate is determined by IR to be polyacrylamide.

The outer water, phase III, is found to contain 1.8 percent acrylamide monomer, showing some leakage from the inner aqueous phase, and 0.03 percent polyacrylamide, probably from traces of w/o emulsion present.

EXAMPLE 3

An aqueous phase, I, is prepared comprising 250 g, ion exchange treated, 50 percent (w/w) aqueous acrylamide, 1.0 ml 6 percent (w/v) aqueous oxalic acid dihydrate, and 1.0 ml 3 percent potassium permanganate. Thus, the system contains $2.96\times10^{-3}$ moles anhydrous oxalic acid and $8.44\times10^{-4}$ moles potassium permanganate per 100 g monomer. The pH of the system is adjusted from 5.4 to 6.5 with 0.1 N sodium hydroxide.

An oil phase, II, is used comprising 58 percent by weight of Sunpar ® 115, 12 percent by weight Lubrizol ® 3140, and 30 percent by weight sorbitan monooleate surfactant.

The aqueous phase, I, is kept cold in an ice bath with stirring and pumped at 14 ml per minute into 25 g of the oil phase, II, while holding the oil phase in an ice bath and stirring the oil phase with a 2¾ inch turbine impellor at 265 rpm. Microscopic examination shows the aqueous phase to be dispersed in the oil as spheres of 1 micron or less in diameter.

Two hundred fifty g of outer phase, III, is prepared by dissolving 3.41 g Vee Gee Superclear Gelatin (Vyse Gelatin Company), 3.41 g gum arabic, 7 ml of 2 percent aqueous EMA ® 11 resin (Monsanto), w/w, previously adjusted to pH 9, and 7 ml of 2 percent aqueous EMA ® 31 resin, w/w, previously adjusted to pH 9, in 229 g warm (50°-60° C.) water. This outer phase, III, is added to the apparatus as described in Example 1 of this disclosure and brought to 30° C.

Polyacrylamide is prepared by adding the w/o emulsion, I in II, into the outer aqueous phase, III, in the apparatus described in Example 1 of this disclosure and according to the procedure of Example 1.

EXAMPLE 4

Polyacrylamide was prepared as in Example 3, but 1.0 ml 2.57 percent ammonium persulfate was used in phase I in place of oxalic acid and potassium permanganate. Also, the protective colloid system in phase III consisted of 2.5 gm sodium caseinate and 2.5 gm Natrosol ® 250-LR (hydroxyethyl cellulose from Hercules), dissolved in 245 gm distilled water.

EXAMPLE 5

Polyacrylamide may be prepared as in Example 2, but the ratio of I:II:III changed to 8:1:3. Thus, 333 g I, 42 g II and 125 g III should be employed.

EXAMPLE 6

Polyacrylamide may be prepared as in Example 1, but the aqueous phase, I, should contain 62.5 g acrylamide in 52.5 g water, to which may be added 10.0 ml, 2.853 percent (w/v) aqueous ammonium persulfate to yield a system 50 percent in acrylamide and $2 \times 10^{-2}$ M in ammonium persulfate.

EXAMPLE 7

A copolymer of 75 percent dimethyldiallylammonium chloride and 25 percent acrylamide may be prepared following the procedure of Example 1, by preparing the aqueous phase, I, as follows:

Mix 41.7 g 67.4 percent aqueous, commercial grade dimethyldiallylammonium chloride; 18.0 g 52.0 percent aqueous, commercial grade acrylamide; 61.3 g deionized water; 0.75 ml 10 percent (w/v) ethylenediamine tetraacetic acid (EDTA) aqueous, neutralized to pH 7.0; and 5.00 ml 3.994 percent (w/v) aqueous ammonium persulfate.

This will yield a system 30 percent in monomer, $1 \times 10^{-2}$ M in ammonium persulfate, and containing 2,000 ppm EDTA based on the monomer. The pH should be adjusted to 6.5 with 0.1 N sodium hydroxide.

EXAMPLE 8

A copolymer may be prepared of 90 percent acrylamide (AM) and 10 percent 3-acrylamido-3-methylbutyl trimethyl ammonium chloride (AMBTAC), molar ratio, following the procedure of Example 1, by preparing the aqueous phase, I, as follows:

Mix 45.7 g 40 percent aqueous commercial grade AM; 7.3 g 92.4 percent active AMBTAC; 61.0 g deionized water; 0.6 ml 10 percent (w/v) EDTA (aqueous, neutralized to pH 7.0); and 10.0 ml 2.282 percent (w/v) aqueous ammonium persulfate.

This will yield a system 20 percent in monomer, $1 \times 10^{-2}$ M in ammonium persulfate, and containing 2,000 ppm EDTA based on the monomer. The pH may be adjusted to 6.5 with 0.1 N sodium hydroxide.

EXAMPLE 9

An aqueous phase, I, may be prepared by dissolving 37.5 g acrylamide, electrophoresis grade, in 77.5 g deionized water. Ten ml, 3.994 percent (w/v) aqueous ammonium persulfate may be added to yield a system 30 percent in acrylamide and $2 \times 10^{-2}$ M in ammonium persulfate. The pH of the system should be adjusted to 6.5 with 0.1 N sodium hydroxide.

An oil phase, II, may be prepared by blending 37.5 g Span 80, sorbitan monooleate, with 87.5 g paraffin oil.

The aqueous phase, I, should be added slowly to the oil phase, II, at 2,000-4,000 rpm to form a fine dispersion of the aqueous phase.

An outer aqueous phase, III, may be prepared by dissolving 1.25 g Tween 80, polyoxyethylene sorbitan monooleate, in deionized water to make 250 g.

Polyacrylamide may be prepared by adding the w/o emulsion, I in II, into the outer aqueous phase, III, in the apparatus described in Example 1 of this disclosure and according to the procedure of Example 1.

EXAMPLE 10

An oil phase, I, which is the monomer phase, may be prepared by blending to a clear solution:

| Styrene | 50.9 g |
|---|---|
| Ethylvinyl benzene | 11.8 g |
| Divinyl benzene | 14.5 g |
| Benzoyl peroxide | 0.5 g |

An aqueous phase may be prepared by dissolving 0.33 g saponin in 49.7 g deionized water and 116.7 g glycerol.

The outer oil phase, III, should be 225.6 g n-heptane.

The oil phase, I, may be dispersed in the aqueous phase, II, by stirring in a Waring Blender for 1½ minutes to form an o/w emulsion.

Poly(styrene/ethylvinyl benzene/divinyl benzene) may be prepared by adding the o/w emulsion, I in II, into the outer oil phase, III, in the apparatus described in Example 1 and according to the procedure of Example 1, but running the reaction at 80° C. for three hours.

EXAMPLE 11

Poly(acrylic acid) may be prepared, following the procedure of Example 1, by making the aqueous phase, I, as follows:

Mix 37.5 g acrylic acid; 77.5 g deionized water; and 10.0 ml 3.994 percent (w/v) aqueous ammonium persulfate.

This will yield a system 30 percent in acrylic acid and $2 \times 10^{-2}$ M in ammonium persulfate.

EXAMPLE 12

A copolymer, poly(acrylic acid/acrylamide), 25/75 mole ratio, may be prepared, following the procedure of Example 1, by making the aqueous phase, I, as follows:

Mix 9.5 g acrylic acid; 28.0 g acrylamide; 77.5 g deionized water; and 10.0 ml 3.994 percent (w/v) aqueous ammonium persulfate.

This will yield a system 30 percent in monomer and $2 \times 10^{-2}$ M in ammonium persulfate. The pH is adjusted to 6.5 with 0.1 N sodium hydroxide.

Another important aspect of the polymerization method of the present invention concerns use of the three-phase system in which it is carried out to achieve phase transfer of various materials taking part in the polymerization process from the outermost phase to the innermost phase. These materials may be, for example, polymerization initiators or catalysts, chain transfer and blocking agents, reactants for already formed polymers, comonomers, or any agents which will influence or aid in determining the composition, length and configuration of the polymer already prepared or in the process of being prepared.

As indicated, the materials to be transferred are added to the outermost phase of the three-phase system. The materials are transferred to the innermost phase of the system, where they function, by means of a carrier which is added to the middle phase.

The phase transfer carrier is selected from among such types of compounds as ion exchange compounds; inclusion compounds; complexes; or other compounds whereby the material being transferred is bound chemically by ionic or covalent bonds or by secondary forces such as van der Waals forces, or chemically/mechanically, as for example, by clathrates and inclusion compounds. The phase transfer carrier will be selected so as to be compatible with the material to be transferred and accomplish the transfer in the most efficient manner.

The following example illustrates this additional important aspect of the present invention.

EXAMPLE 13

This example demonstrates the hydrolysis of poly(acrylamide) to poly(acrylic acid) in the innermost phase of the three-phase system.

Poly(acrylamide) may be prepared as in Example 1, but the aqueous phase, I, has sodium chloride added to it, for later ion exchange with hydroxide ion. Thus:

Mix 37.5 g acrylamide; 77.5 g deionized water; 10.0 ml 3.994 percent (w/v) aqueous ammonium persulfate; and 35.0 g sodium chloride.

This will yield a system 23 percent in acrylamide, $2 \times 10^{-2}$ M in ammonium persulfate with 0.53 equivalents of acrylamide and 0.60 equivalents of sodium chloride.

Poly(acrylamide) may then be prepared as in Example 1, but when the polymerization is complete, 50 g of a liquid ion-exchange material, Aliquat ® 336, will be added to the reaction kettle. The water-insoluble Aliquat ® 336 will dissolve in the oil, phase II. Fifty g 50 percent aqueous (w/w) sodium hydroxide, 0.63 equivalents, should be metered into the outer water, phase III, over one-half hour. Chloride groups of the Aliquat ® 336 exchange with hydroxyl groups from the sodium hydroxide. The hydroxyl groups are carried to the inner phase, I, where they exchange with the chloride of the sodium chloride. The presence of hydroxyl groups induces hydrolysis of the poly(acrylamide) to poly(acrylic) acid. The reaction should be allowed to proceed for three hours after the last addition of sodium hydroxide.

What is claimed is:

1. A method of polymerization utilizing a water/oil/water system, comprising the steps of
   (a) adding to the innermost water phase the monomer material to be polymerized;
   (b) adding, with mechanical agitation, the product of Step (a) to the middle oil phase, said oil phase containing from 0.01 to 40 percent by weight, based on the weight of said oil phase, of a surfactant having an HLB of from 2 to 5, whereby a water-in-oil emulsion of the innermost and middle phases is formed; and
   (c) adding, with mechanical agitation, the emulsion product of Step (b) to the outermost water phase, said water phase containing from 0.01 to 10 percent by weight, based on the weight of said water phase, of at least one member selected from the group consisting of surfactants having an HLB of at least 8 and protective colloids, wherein polymerization proceeds in the innermost water phase until complete.

2. The method of claim 1 wherein the middle oil phase additionally contains a stabilizing additive.

3. The method of claim 2 wherein the stabilizing additive is a member selected from the group consisting of polybutadiene, polyisobutylene, poly(styrene/butadiene) and styrene-based polyesters.

4. The method of claim 1 wherein the innermost water phase additionally contains one or more members selected from the group consisting of polymerization initiators and catalysts, and chain transfer and blocking agents.

5. The method of claim 1 wherein the concentration of monomer in the innermost water phase is from 1 to 70 percent by weight of said innermost phase.

6. The method of claim 1 wherein the HLB of the surfactant contained in the outermost water phase is at least 14.

7. The method of claim 1 wherein the innermost water phase comprises from 10 to 95 percent by weight of the total three-phase system.

8. A method of polymerization utilizing an oil/water/oil system, comprising the steps of
   (a) adding to the innermost oil phase the monomer material to be polymerized;
   (b) adding, with mechanical agitation, the product of Step (a) to the middle water phase, said water phase containing from 0.01 to 10 percent by weight based on the weight of said water phase, of a surfactant having an HLB of at least 8, whereby an oil-in-water emulsion of the innermost and middle phases is formed; and
   (c) adding, with mechanical agitation, the emulsion product of Step (b) to the outermost oil phase, said oil phase containing from 0.01 to 40 percent by weight, based on the weight of said oil phase, of a surfactant having an HLB of from 2 to 5, wherein polymerization proceeds in the innermost oil phase until complete.

9. The method of claim 8 wherein the middle water phase additionally contains a stabilizing additive.

10. The method of claim 9 wherein the stabilizing additive is a member selected from the group consisting of polyethylene glycol, polyvinyl alcohol, polyvinylpyrrolidone, methyl cellulose, hydroxypropyl cellulose, hydroxyethyl cellulose and poly(ethylene/maleic anhydride).

11. The method of claim 8 wherein the innermost oil phase additionally contains one or more members selected from the group consisting of polymerization initiators and catalysts, and chain transfer and blocking agents.

12. The method of claim 8 wherein the concentration of monomer in the innermost oil phase is from 1 to 70 percent by weight of said innermost phase.

13. The method of claim 8 wherein the HLB of the surfactant contained in the middle water phase is at least 14.

14. The method of claim 8 wherein the innermost oil phase comprises from 10 to 95 percent by weight of the total three-phase system.

15. A method of polymerization utilizing a three-phase water-in-oil-in-water or oil-in-water-in-oil system comprising the steps of
(a) adding the monomer material to be polymerized to the innermost water or oil phase;
(b) adding, with mechanical agitation, the product of Step (a) to the middle water or oil phase, said phases containing, respectively, from 0.01 to 10 percent by weight of a surfactant having an HLB of at least 8, or from 0.01 to 40 percent by weight of a surfactant having an HLB of from 2 to 5, said percentages based on the weight of the respective phases, whereby an emulsion is formed;
(c) adding, with mechanical agitation, the emulsion product of Step (b) to the outermost oil or water phase, said phases containing, respectively, from 0.01 to 40 percent by weight of a surfactant having an HLB of from 2 to 5, or from 0.01 to 10 percent by weight of a surfactant having an HLB of at least 8, said percentages based on the weight of the respective phases; and
(d) providing to the innermost water or oil phase one or more materials selected from the group consisting of polymerization initiators and catalysts; chain transfer and blocking agents; reactants for a polymer formed or being formed in the innermost phase; one or more comonomers for a polymer being formed in the innermost phase; and any agents which will influence or aid in determining the composition, length and configuration of a polymer formed, or being formed, in the innermost phase, by means of a phase transfer carrier added, together with the material selected above, to the outermost phase, whereby the phase transfer carrier and material are bound together and migrate to the innermost phase, where the material is released.

* * * * *